United States Patent [19]
Petersen

[11] 3,712,127
[45] Jan. 23, 1973

[54] DRIVE TRAIN TEST STAND
[75] Inventor: Niel R. Petersen, Hopkins, Minn.
[73] Assignee: MTS Systems Corporation, Minneapolis, Minn.
[22] Filed: Aug. 11, 1970
[21] Appl. No.: 62,856

[52] U.S. Cl. .................................73/118, 73/136 D
[51] Int. Cl. ............................................G01m 13/02
[58] Field of Search ........73/117, 133, 136 R, 136 D, 73/117.2, 118, 116, 99, 162

[56] References Cited

UNITED STATES PATENTS

| 3,456,498 | 7/1969 | Jaeschke | 73/116 |
| 3,298,228 | 1/1967 | Oltean | 73/162 |
| 3,505,863 | 4/1970 | Lucia | 73/116 |
| 3,180,138 | 4/1965 | Hundley | 73/117 |
| 3,405,557 | 10/1968 | Sinke, Jr. | 73/162 |

Primary Examiner—Jerry W. Myracle
Attorney—Dugger, Peterson, Johnson & Westman

[57] ABSTRACT

A test stand for testing vehicle drive trains which includes means for loading the drive train with dynamic inertial loads that can be superimposed on static or usual torque levels. The inertial load on the drive train can be used to simulate acceleration and braking loads.

12 Claims, 3 Drawing Figures

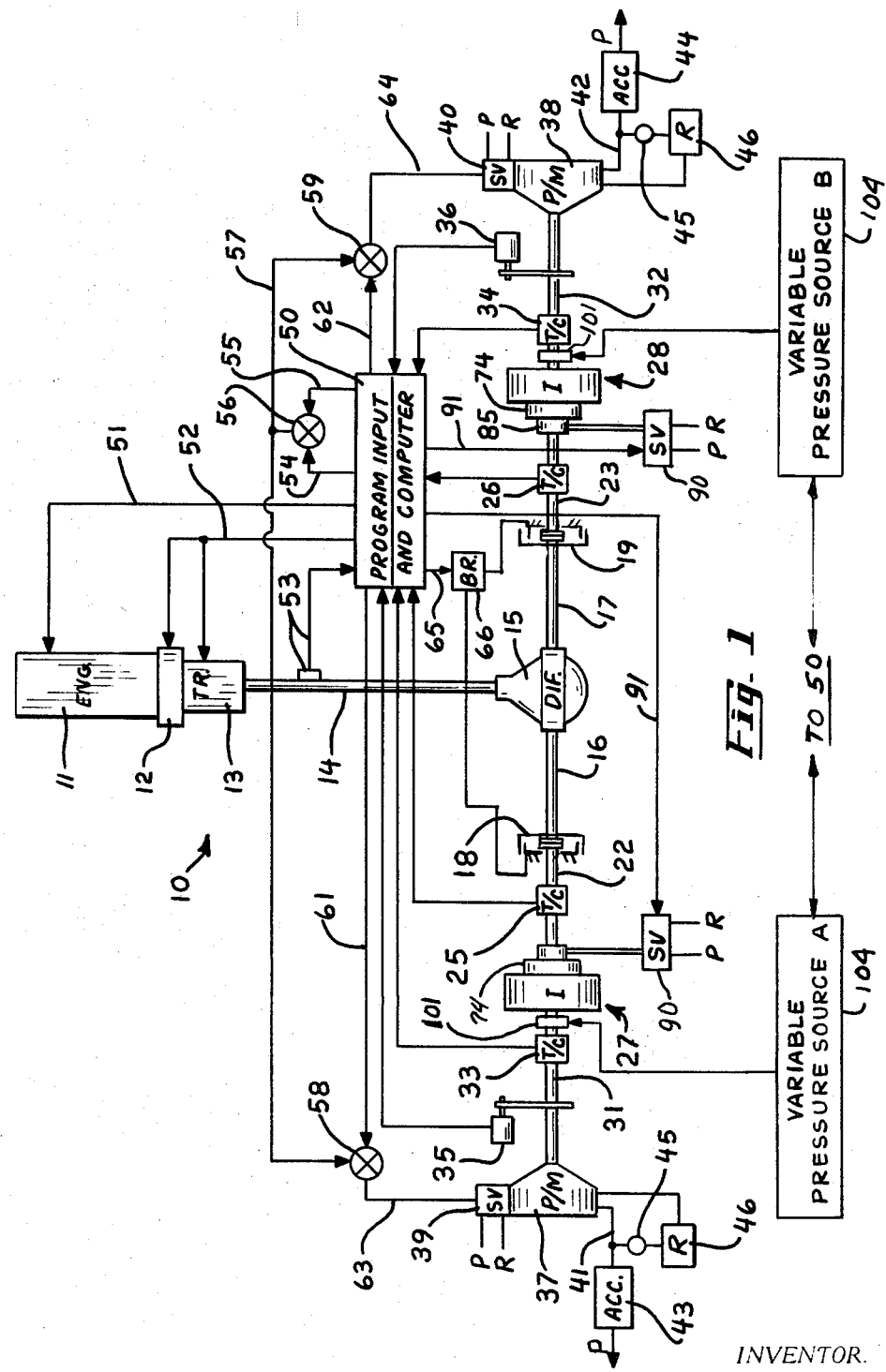

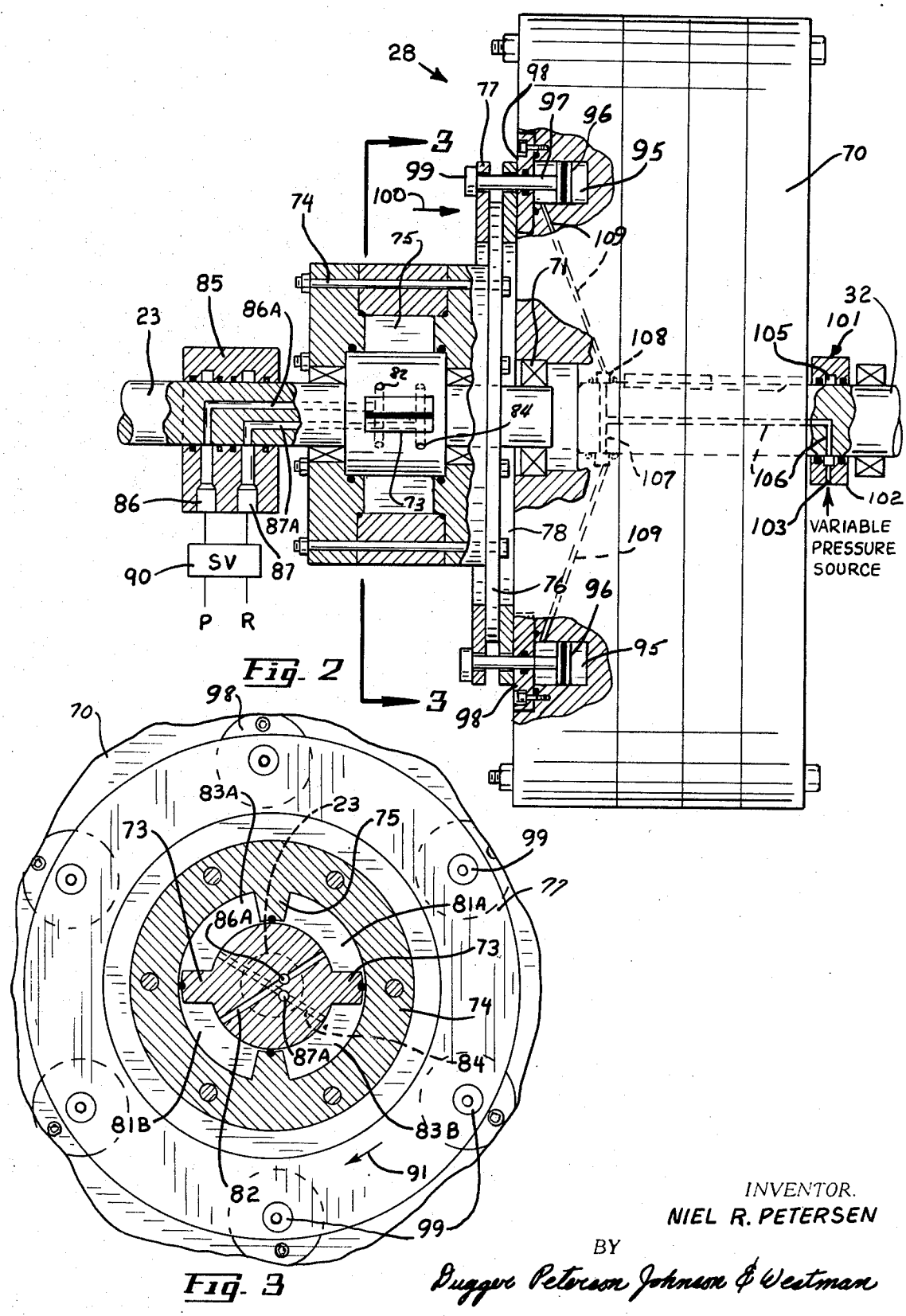

DRIVE TRAIN TEST STAND

BACKGROUND OF THE INVENTION

1. Field of the Invention

The present invention relates to methods and apparatus for testing drive components.

2. Prior Art

Various testing techniques have been advanced through the years for testing vehicle drive components. It is desirable to run simulated laboratory tests prior to actual field tests because performance data can be obtained on an accelerated schedule. Also, any desired loading can be programmed into the testing systems to simulate road conditions.

A gear tooth mesh profile measuring system is shown in U.S. Pat. No. 3,405,557, issued Oct. 15, 1968 to R. A. Sinke, Jr. This device does have an inertia producing weight 16 on an output shaft from the gear set being tested, but the inertial member is merely placed on the output drive shaft. There is no provision for shifting the weight while the weight is rotating.

A simulated inertial system is shown in U.S. Pat. No. 2,882,721 to provide test data for vehicles.

Other transmission test devices or dynamometers are shown in U.S. Pat. Nos. 3,451,262 and 3,195,350.

SUMMARY OF THE INVENTION

The present invention relates to a test stand for drive components and also a method of operating such a test stand for testing drive trains and the like devices under controlled conditions. The test stand includes means for controlling loads on the drive train. As shown, the main loading device comprises a hydraulic pump-motor that is driven by the drive train, and can be set at differing load levels to change the load on the drive train. The output of the hydraulic device is connected to a large accumulator means, and the accumulator means can be used for other functions in the drive train test stand. In addition, large weights to simulate inertial loads on the item tested are included. These weights are mounted so that they can be shifted relative to their mounting while spinning, to simulate a dynamic inertial load. A commutated rotary hydraulic actuator is utilized for imposing these dynamic programs in the form shown.

The inertial load on the output of the drive train also can be used for simulating acceleration and braking loads. Loads caused by wind drag on the vehicle, and hill losses and gains are absorbed by the hydraulic pump-motors.

The weights that simulate the inertia of the vehicle mass are connected to rotating members with quickly adjustable friction disc clutches to permit a slipping of the weight to simulate wheel skid under heavy acceleration or deceleration. The torque capacity of the clutches may be changed while the unit is operating. The inertia on the tested device can be changed by changing the amount of weight.

BRIEF DESCRIPTION OF THE DRAWINGS

FIG. 1 is a schematic view of a drive train test stand made according to the present invention;

FIG. 2 is a fragmentary enlarged side elevational view of a typical weight installation on the drive train test stand of the present invention; and FIG. 3 is a sectional view taken as on lines 3—3 in FIG. 2.

DESCRIPTION OF THE PREFERRED EMBODIMENT

A drive train test stand illustrated generally at 10 is set up as shown schematically and includes as shown a power source, for example an engine 11, that is usually used for the vehicle drive train that is shown being tested. The drive train shown includes a clutch 12, and a manual shift transmission 13. (If the transmission is automatic, of course, there would be no clutch.) The stand includes controls (not shown) on it for shifting gears in response to signals given. A drive shaft 14 coming from the transmission drives a differential 15 in the usual manner. The differential is an automotive type and has a set of differential gears driving output axles 16 and 17, respectively.

The axles 16 and 17 are provided with brake assemblies 18 and 19, which have sleeves acting against brake drums so that the axles can be subjected to braking loads, if desired. The axles 16 and 17 are in turn drivably connected to output load shafts 22 and 23, respectively, that are made so that they will rotate with the axles 16 and 17.

The output load shafts 22, 23 have torque sensing cells 25 and 26, respectively, attached thereto. The torque cells are of usual design and will sense the torque being carried by the respective output load shafts. Weight assemblies illustrated generally at 27 and 28 are mounted to the respective shafts 22 and 23 to provide inertia on the drive train. The large weights are normally drivably mounted to the output shafts 22, 23. The details of the inertial providing weight assemblies are more fully shown in FIGS. 2 and 3 and will be explained in more detail.

Second output shafts 31 and 32, respectively, are drivably connected to the weight assemblies 27 and 28 on the output sides thereof. The second output shafts are not directly connected to the first output shafts. Second torque sensing cells 33 and 34 are mounted to sense torque in these second output shafts 31 and 32. Tachometers 35 and 36 are drivably mounted through a positive drive to the second output shafts 31 and 32, respectively, to sense the speed of rotation of these second output shafts. The shafts 31 and 32 in turn are drivably mounted to drive separate hydraulic variable volume pumps illustrated at 37 and 38. The pumps 37 and 38 also can be driven by hydraulic pressure to act as motors. This permits applying overdriving loads on the drive train by proper control. These devices, namely the variable volume pumps or motors 37 and 38 form the load devices for the drive train to load it to the desired torque levels during the testing program.

The pumps or motors 37 and 38 have servovalve control units 39 and 40, respectively, each of which are connected to a pressure source and a fluid return or reservoir labeled P and R in FIG. 1. The servovalves 39 and 40 regulate the volume hanger or volume control on the pumps or motors 37 and 38 so that for any fixed pressure and any set speed, the torque necessary to drive the pumps or motors and thus the power required can be changed. Further, the servovalves 39 and 40 may be used to reverse the operation of the pumps by moving internal controls and then the pumps will run as motors. The pumps used may be Series 60 Variable Volume Pumps sold by The Dennison Division of Abex Corporation, Cleveland, Ohio.

The output of the pumps or motors 37 and 38 goes through pressure lines 41 and 42, respectively, and can be used to charge accumulators 43 and 44, respectively, which in turn can have outputs that are used for other components of the system, for example for supplying pressure to the servovalves regulating the pumps or motors 37 and 38 and also to power the members 37 and 38 when they operate as motors.

Suitable reservoirs for drain are also provided, and these are indicated at 46. Relief valves 45 can be provided in the circuit to bypass the pressure lines 41 and 42 to the reservoirs 46 when the pressure in the respective accumulators exceeds a predetermined amount.

The test stand is controlled by a program for differing loads, and for simulating the actual conditions of operation of an automobile. A box 50 represents both the program input which would be the set program desired for each of the functions and a computer that receives information from various input sources on the test stand to determine whether or not the program is being followed, and to make corrections. The programmer gives electrical signals to various controls and the computer would read the results, compare the results with the desired program and then adjust the controls to meet the desired program, if necessary. For example, a throttle control 51 is used to control the speed of the engine 11, if desired, and the transmission and clutch control signals are sent along a line 52 to shift transmission gears in accordance with the preset program. A feedback tachometer 53 provides a signal along a provided line to the computer to determine whether or not the proper speed is being maintained by the engine, when the proper gear is set. The programmer also feeds out a simulated hill load signal along a line 54, and a simulated "wind" load signal along a line 55, which are summed at a junction 56, and a combined wind-hill signal is then fed along line 57 to further junctions 58 and 59. Signals may be fed from the programmer along lines 61 and 62 to represent loading from curves. There is a differential loading at each of the axles 16 and 17 when going around a curve. The curve signals and the combined wind-hill signals are passed through the junctions 58 and 59. Finally, the load signal to each output is passed along lines 63 and 64 to the servovalves 39 and 40, respectively. The servovalves control the torque on the drive train output shafts by controlling the volume on the pumps or motors 37 and 38 in accordance with the signals on lines 63 and 64. The servovalves 39 and 40 can be varied to change the load from the pumps, as desired.

The torque cells 25 and 26 feed signals along provided lines back to the computer, as do the torque cells 33 and 34. In addition, feedback signals from tachometers 35 and 36 are provided to the computer, and all of this information is correlated in the computer to determine that the proper load and speed are actually present on the output shafts in relation to the programmed input.

The program also may provide a braking signal along a line 65 to a brake control 66 which in turn actuates the brakes 18 and 19 on the axles 16 and 17 to simulate braking loads. The brakes, of course, would be the hydraulic brakes actually used on the drive train, and the brake control member 66 takes the electrical signal from line 65 and converts it into a mechanical signal for the hydraulic brake.

One of the problems in testing drive trains has been the simulation of high frequency dynamic loading on the drive train. The inertia creating weights 27 and 28, which have been previously shown schematically, are shown in detail in FIGS. 2 and 3.

Referring to FIG. 2, the typical weight member which is shown at 28, and is only reversed for the other member 27, includes large steel weights 70. The weights 70 are bolted together as desired to create one solid mass. The weights are selected to simulate the weight and inertia of the vehicle for which the drive train is designed.

The first output shaft 23, as shown, is mounted for rotation with respect to the weight member 70 with a suitable bearing 71 that is mounted in the weight member. The weight itself in turn is drivably mounted onto and supported by the second output shaft 32 which, as shown, is supported on suitable bearings 72.

Thus, it can be seen that there is no direct driving connection between the inertia creating weight 70 and the first output shaft 23.

The first output shaft 23, as shown, has a portion that is formed into the rotor of a rotary hydraulic actuator. The rotor can be of larger diameter than the main part of the shaft, as shown. The rotor portion of shaft 23 has vanes 73 attached thereto and these vanes extend radially outwardly on opposite sides of the shaft 23. These vanes, as shown, are formed integral with the shafts, but can be attached to the rotor portion of the shaft in a suitable manner, such as welding or bolting. The rotary actuator can include a usual short shaft that would merely be coupled to the shaft 23 to form an extension of shaft 23, if desired.

The vanes 73 cooperate with an outer housing 74 to form a rotary type hydraulic actuator. The housing 74 includes a center section that has mating inwardly extending abutments 75, as shown in FIG. 3. The interior of the housing is suitably sealed with respect to the rotor portion of shaft 23 to prevent hydraulic fluid leakage during operation. The housing 74 in turn is drivably attached to a clutch disc member 76 that is held between a clamp or pressure ring 77, and a friction ring or clutch plate 78. The clamp ring 77 is held against the disc member by a plurality of piston and cylinder assemblies 79 plumbed in parallel as will be explained more fully. The housing 74 is drivably mounted onto disc 76, and the drive between the shaft 23 and the inertia creating weight member 70 is thus through the housing 74 and the friction type clutch formed by the disc 76, ring 77, ring 78 and the piston and cylinder assemblies. The material for the discs 76, ring 77, and ring 78 may be of any desired material to obtain the proper pictorial and wear properties.

The actuator vanes 73 and abutments 75 form sealed first hydraulic chambers 81A and 81B inside housing 74, which are communicating with each other through a cross bore 82 in the rotor portion of shaft 23, and second chambers 83A and 83B which communicate with each other through a cross bore shown in dotted lines at 84.

The vanes 73 are sealed with respect to the interior periphery of the housing 74 and the abutments 75 are sealed with respect to the rotor portion of shaft 23 so that hydraulic pressure can be maintained between the chambers 81 and the chambers 83.

Fluid under pressure is supplied to the chambers 81A, 81B and the chambers 83A, 83B selectively through the use of a rotary hydraulic commutator 85. The hydraulic commutator 85, as shown, includes input ports 86 and 87 opening to the exterior thereof, which in turn communicate with passageways 86A and 87A respectively defined in shaft 23. The ports 86 and 87 and the passageways 86A and 87A are sealed off from each other in the commutator housing with suitable sealing means as shown. The input port 86 opens to an annular groove defined in the commutator 85 and which extends around the shaft so that as the shaft rotates, the passageway 86A always is in communication with the port 86. The port 87 also opens to an annular groove in commutator 85 so the passageway 87A is always in communication with the port 87.

A servovalve 90 is utilized to direct fluid under pressure to the rotary actuator formed between the vanes 73 and the abutments 75 on the housing 74. The servovalve 90 (there is one for each actuator) receives fluid under pressure from a source indicated at P in FIG. 2 and has a return port shown at R in FIG. 2. The servovalve receives control signals from the programmer-computer through a line 91 shown in FIG. 1. The servovalve is a four way valve.

The passageway 87A communicates with the cross bore 84, and thus fluid under pressure in passageway 86A will be provided to the chambers 83A and 83B. Passageway 86A communicates with the cross bore 82, and thus any fluid under pressure in passageways 87A will be supplied to the chambers 81A and 81B.

The chambers 81 and 83 are always filled with fluid, and thus the drive force on the vanes 73 on the shaft 23 is transmitted through the noncompressible hydraulic fluid in their respective chambers depending upon the direction of rotation, and to the abutments 75 to the housing 74 and through the slip clutch assembly to the inertial weight. When the servovalve 90 is closed, the noncompressible hydraulic fluid cannot escape from either set of chambers 81 and 83 and thus the fluid will provide the drive connection.

The plurality of cylinder piston assemblies that are used for actuating the clutch assembly to vary the pressure and therefore the torque capacity of the clutch are shown in FIG. 2. The torque capacity of the clutch is proportional to the force with which the clutch disc or plate 76 is clamped between the rings 77 and 78. In order to simulate different loadings on the individual wheels of an automobile and thus on the individual output shaft 23, under differing co-efficients of friction of the wheels, the cylinder permits the rapid changing of the load that can be carried by the respective slip clutch assembly. The units on each side of the test stand are identical except one is right hand and one if left hand. Each of the weight members 70, adjacent its ring 78, has a plurality of cylinders 95 defined therein. The cylinders 95 are spaced radially, and as shown, six cylinders can be utilized if desired.

Each of the cylinders has an internal piston 96 which is sealed with respect to the walls of the cylinders and a rod 97 fastened to each piston extends through a cover member 98 in a sealing fashion through provided openings in the discs 78 and 77. A head 99 is used on the ends of the cylinder rods. The heads 99 can be fastened to the rods in any suitable manner, such as pins, threads or the like, and the heads will transfer force exerted on the rod 97 by pressure in the rod end of the corresponding cylinder to force the ring 77 in direction as indicated by the arrow 100. The cylinders are thus sealed, and the pistons are actuated by fluid under pressure, for example pneumatic cylinders can be used, or if desired hydraulic fluid can also be used. The fluid under pressure again is introduced into the cylinders through a commutator illustrated generally at 101 and of the same general construction as that previously explained. The commutator ring 102 is stationary, and has an input port 103 connected to a variable pressure source illustrated schematically at 104 (separate variable pressure sources A and B are shown in FIG. 1). The variable pressure source is designed to maintain a pre-selected pressure on the port 103, and this preselected pressure can be changed in accordance with the programmed input and the computer commands to the pressure source. A specific form of variable pressure source may be a variable relief valve which is remotely controlled by computer signals so that the setting of the valve can be changed to change the pressure at port 103.

As shown, the port 103 opens into an annular ring-type chamber 105 that completely surrounds the shaft 32 there is one of the commutator housings 102 for each of the weight assemblies 70, just as there is one of the actuator assemblies for each of the output shafts.

The annular chamber 105 opens and aligns with a passageway 106 defined in the shaft 32. Suitable sealing rings are provided on opposite sides of the chamber 105 so that the passageway is sealed and no oil leakage or air leakage will occur. Passageway 106 then leads along the longitudinal axis of the shaft 32 and opens through a pair of cross ports illustrated in dotted lines at 107 to an annular sealed chamber 108 defined on the interior of the bore for the weight assembly 70. This chamber 108 is sealed off to prevent fluid under pressure from escaping. Then, each of the cylinders 95 is provided with a passageway 109 which leads from the passageway 108 into each individual cylinder 95, and which is positioned so that it will be on the rod side of the piston 96 where it opens to the cylinder 95. The piston rods 97 can be of selected length so that this occurs. The passageways 109 are made and positioned so that they can be drilled in if desired.

Then, the pressure at port 103 which comes from the variable pressure source and which can be keyed in by the computer program determines force exerted on the piston 96 in direction of arrow 100 and thus determines the torque capacity of each of the friction slip clutch assembly driving the weight assembly 70. Under normal situations this would be the skidding torque of the wheels depending on the co-efficient of friction between the wheels and the surface on which they operate.

In operation, with the shaft 23 rotating, if it is desired to introduce a dynamic inertial load, it should be noted that the weight 70 will be spinning because of the drive from the rotary hydraulic actuator to this weight. Then, if a change in the dynamic inertial load is desired, fluid under pressure can be supplied by the servovalve 90 through ports 87 for example, and at the same time the servovalve will open port 86 to return. This will put in an amount of fluid under pressure in port 86, through passageway 87A and cross bore 84. The fluid under pressure would enter chambers 83A and 83B, which would then thrust the housing 74 in direction as indicated by arrow 91 with respect to the shaft 23 because of the pressure built up between the vanes 73 and the abutments 75 in the chambers 83A and 83B. The fluid in chambers 81A and 81B would be open to the reservoir through the servovalve. This shift of the weight 70 relative shaft 23 would give a momentary dynamic load that would place a load onto the drive train that would simulate operating loads. Opposite direction torques can also be supplied merely by changing the signals at servovalve 90 and reversing the direction of fluid flow so fluid under pressure is supplied to chambers 81A and 81B and chambers 83A and 83B open to drain. Each of the weight assemblies 27 and 28 include the actuators 74, commutators 85 and servovalve 90, as described. The servovalve 90 for each weight may be separately controlled.

It should be noted that the volume of oil that needs to be supplied to change the inertia on the system or introduce a further inertial load of a different magnitude is quite small so that this can be done very quickly without changing the speed of operation. The torque cells provided in the output shafts sense the change in torque because of this differing inertial load quickly and provide the necessary information back to the computer to insure the program it is being met.

It should be noted again that the hydraulic pumps 37 and 38 which absorb the power delivered by the engine through the drive train can be used to charge large accumulators 43 and 44 to provide hydraulic fluid under pressure for items such as the servo valves 90, and the rotary actuators or for other functions in the drive program. The accumulators also can power remote hydraulic actuators.

The variable torque capacity of the slip clutches for each weight 70 permits the changing of the torque on axle shafts 23 during operation of the drive train test stand. For example, in order to simulate the situation when automobile tires may be spinning on an icy spot on the road, the variable pressure source can be set at a lower pressure so that the disc 76 will merely spin and will not be turning the weight 70, and then suddenly the variable pressure source (A OR B), in response to a remote signal from the computer can be increased significantly in pressure to a desired level. This will introduce fluid under pressure immediately to the interior of the cylinders 95 acting on pistons 96 and increasing the tension on the rods 97. This will thereby clamp the disc 76 more tightly between the rings 77 and 78, and will immediately place a high load on the shaft 23, just as would happen if a wheel that was spinning on ice suddenly engaged dry pavement and subjected the drive train to a very heavy shock load.

For ordinary running the variable pressure sources can be maintained at the usual setting necessary to simulate the co-efficient of friction between the tire and the road surface, and can be adjusted to fit any desired co-efficient of friction. In short, where the surface is slippery, the torque capacity of the variable load slip clutch will be reduced to simulate this friction, and if wheel skids are to occur, they would then occur at a lower load than where the automobile was simulated to be operating on roads having high co-efficient of friction, for example dry pavement. Thus the setting of the variable slip clutch can simulate wet pavement, wet blacktop or asphalt, icy surfaces, sanded surfaces, or any other desired surface condition. The dynamic loading can be introduced at the same time that the slip clutch loading is being changed to further present compound programs if desired.

The friction clutch using disc 76 and ring 77 can be set so that when the brakes 18 and 19 are locked to stop the axles 16 and 17, the friction clutch will slip to give a simulated vehicle skid situation on the drive train and axles. In other words, the frictional clutch driving the inertia supplying weights can be adjusted so that the load will simulate a wheel skid, and the entire inertial load will not have to be absorbed by the drive drain brakes 18 and 19.

What is claimed is:

1. In a test apparatus for simulating loads on driven components, load means driven by said driven components to place a load on said components, a weight mounted on one of said driven components, said one driven component being rotationally driven during testing, means connecting said weight to said one driven component comprising a hydraulic actuator forming a driving connection between the one driven component and said weight, and means including hydraulic commutator means supplying fluid under pressure to said actuator while said weight and said one driven component are rotating, and hydraulic control means to control flow of fluid under pressure through said commutator means to permit shifting the angular position of the weight relative said one driven component as said component and weight are rotating.

2. The combination as specified in claim 1 and program means operative through said control means to initiate action of said actuator upon a predetermined signal to shift said weight relative said one driven component.

3. The combination as specified in claim 1 wherein said one driven component comprises a shaft, and said hydraulic commutator means includes a section rotatably mounted with respect to said shaft to permit said section to remain stationary while said shaft rotates, port means opening through said actuator, and passage means defined in said shaft, said passage means opening through said shaft to said port means and said actuator at a distance spaced from said commutator means.

4. In a test apparatus for simulating loads on driven components, a power source for driving said driven components, load means to be driven by said driven components to place a load on said components comprising hydraulic pump means, said hydraulic pump means producing fluid under pressure when said driven components are driven to create a load on the components, and accumulator means for storage of said fluid under pressure, said accumulator means being of sufficient size to supply fluid under pressure to said hydraulic pump means to simulate downhill loading condition and to tend to overdrive said components.

5. In a drive train test system for testing rotating components, said components including a rotating output shaft, and power means to drive said rotating shaft, the improvement comprising load applying means adapted to be driven by said rotating output shaft, weight means forming an inertial load, connecting means adapted for drivably connecting said weight means with respect to said rotating output shaft and selectively shifting said weight means with respect to said rotating output shaft while said output shaft is rotating, said connecting means including reactive force applying means having one reactive element adapted for connection to said output shaft and a second reactive element connected to said weight means, and means to apply power to said reactive force applying means to thereby move said weight means in either angular direction with respect to said output shaft when said output shaft and weight means are rotating and the connecting means, load applying means and one reactive element are connected to said output shaft.

6. A drive train test system for testing components used on powered vehicles, said components including a rotating power output shaft of said drive train, and power means to drive said rotating shaft, said test system comprising load means driven by said rotating output shaft, weight means forming an inertial load, connecting means to drivably connect said weight means with respect to said rotating output shaft and selectively to shift said weight means with respect to said rotating output shaft while said output shaft is rotating, said connecting means comprising hydraulic actuator means, said actuator means including a first element drivably connected to said rotating output shaft, a second element movably mounted with respect to said rotating output shaft and drivably connected to said weight means, and fluid pressure reaction means between said first element and said second element whereby changing the amount of fluid between said elements causes a shifting of said first and second elements, and hydraulic commutator means to supply fluid under pressure to change the amount of fluid between said elements selectively while said output shaft is rotating.

7. The combination as specified in claim 6 wherein the drivable connection between said weight means and the second element of said actuator means comprises slip clutch means adapted to permit rotation of said weight relative to said second element of said actuator means and said output shaft when the torque acting between said output shaft and said weight exceeds a predetermined amount, irrespective of movement of said actuator means.

8. The combination as specified in claim 7 wherein said output shaft drives said load means through said weight means, and said connecting means between said weight means and said shaft.

9. A test system for testing components used on powered vehicles, said components including a drive train having a rotating power output shaft, and power drive means to drive said rotating output shaft, said test system comprising weight means forming an inertial load, connecting means to drivably connect said weight means with respect to said rotating output shaft, and load means driven by said rotating output shaft comprising a hydraulic pump which operates also as a motor, said hydraulic pump pumping fluid under pressure, accumulator means operatively coupled to said pump to store fluid under pressure, and servovalve means for controlling output of said accumulator means whereby fluid under pressure from said accumulator means may be introduced into said pump to cause said pump to act as a motor and to tend to overrun said rotating output shaft.

10. A test system for testing components used on powered vehicles, said components including a drive train having a rotating power output shaft, and power means to drive said rotating shaft, said test system including load means driven by said rotating output shaft, weight means forming an inertial load, connecting means to drivably connect said weight means with respect to said rotating output shaft, and selectively to shift said weight means with respect to said rotating output shaft while said output shaft is rotating, said means connecting said weight means to said shaft including friction clutch means, and clutch control means to permit changing the torque capacity of said friction clutch as said shaft is rotating.

11. The combination as specified in claim 10 wherein said clutch control means comprises fluid pressure actuated means controllable to provide different pressures on the actuated means.

12. A drive train test system for testing components used on powered vehicles, said components including a rotating power output shaft of a drive train, and power means to drive said rotating shaft, said test system including load means driven by said rotating output shaft, weight means forming an inertial load, connecting means to drivably connect said weight means with respect to said rotating output shaft comprising friction clutch means, and actuating means for said friction clutch means to permit varying the torque capacity of said friction clutch means as said output shaft is rotating, said actuating means including fluid pressure responsive means to change the torque capacity of said friction clutch means.

* * * * *